March 10, 1942.　　　S. O. SHIELDS　　　2,275,871
METHOD OF WINDING COILS
Filed March 11, 1941
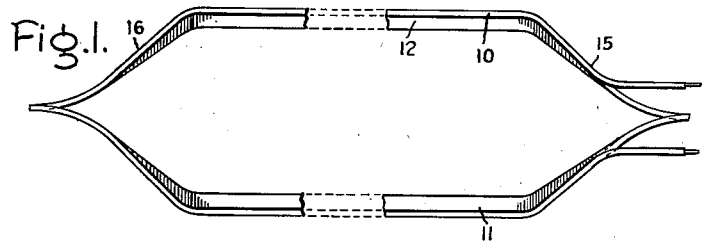
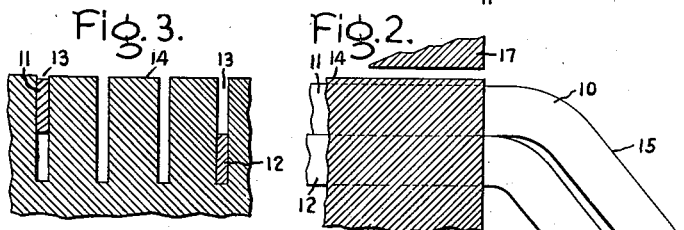
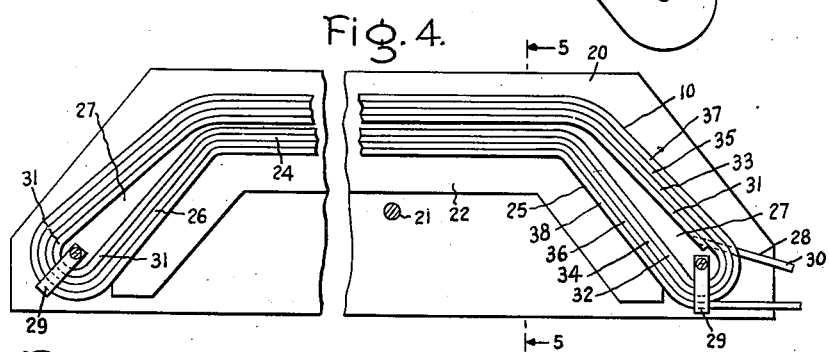
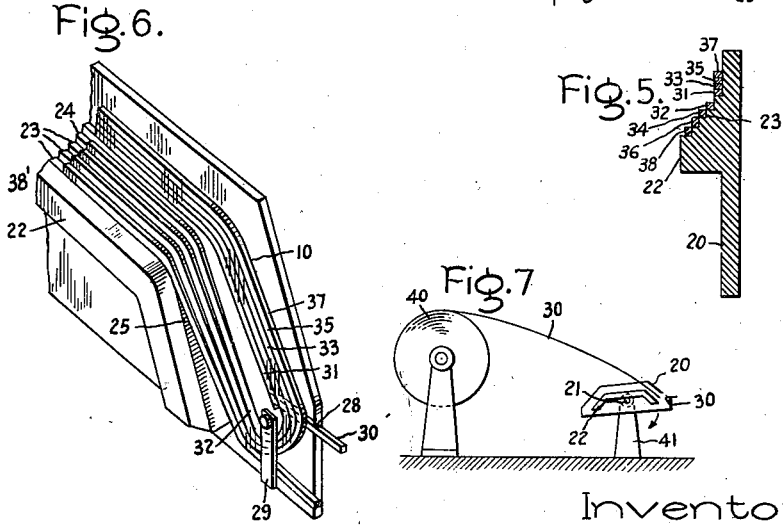
Inventor:
Stanley O. Shields,
by Harry E. Dunham
His Attorney.

Patented Mar. 10, 1942

2,275,871

UNITED STATES PATENT OFFICE 2,275,871

METHOD OF WINDING COILS

Stanley O. Shields, Peterborough, Ontario, Canada, assignor to General Electric Company, a corporation of New York Application March 11, 1941, Serial No. 382,724
In Canada August 8, 1940

4 Claims. (Cl. 140—92.1)

My invention relates to electrical windings for dynamo-electric machines, and particularly to a method for constructing preformed coils.

In large alternating current generators and the like in which the windings consist of heavy conductors disposed in armature slots, it is customary to form the coil to its required shape, insulate it, and then insert the completed coil in the slots. When located in the slots, the ends of the coil project beyond the sides thereof. It has also been customary in the manufacture of such preformed coils in which the ends of the coil are not bent to any material degree from the plane of the armature surface in which they are located, to wind first the heavy conductors into a loop and then to spread the loop in a forming device so that the sides of the coil which enter the slots are disposed in approximately parallel relationship and spaced apart to the form they require to occupy the desired positions in the slots. In some machines, however, it is desirable that the ends of the coil which project beyond the armature should have a deep drop, that is, extend from the armature bent at a substantial angle from the surface of the armature away from the cooperating rotor. If it is attempted to form the coil in accordance with prior practice as above described, and then bend it to give the deep drop required at the ends of the coil, it is found that the turns of the coil loosen up and are not satisfactory. It has been customary to construct preformed coils with deep drop ends by winding them by hand to their final form on special forms which are expensive to construct.

It is the object of my invention to provide an improved method for winding preformed coils with deep drop ends.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a view of a completed preformed coil; Fig. 2 is a side view of one end of a completed coil shown inserted in an armature slot; Fig. 3 is an end partial view of the arrangement shown in Fig. 2; Fig. 4 is a plan view, partly broken away, of a winding form made in accordance with my invention showing a completely wound coil thereon; Fig. 5 is a sectional view taken along line 5—5 of Fig. 4; Fig. 6 is a perspective view showing an end portion of the arrangement illustrated in Fig. 4; and Fig. 7 is a diagrammatic view of the entire winding device.

Referring to the drawing, I have shown an arrangement for making a preformed coil 10 having coil sides 11 and 12 designed to be inserted in slots 13 of a dynamo-electric machine armature stator core 14 of magnetic material. The coil end turns 15 and 16 extend angularly away from the peripheral surface of the core 14 of the stationary member of the machine and from the cooperating dynamo-electric machine rotatable member 17 fragmentarily shown in Fig. 2.

In order to construct the coil, I provide a form 20 rotatably mounted on a pivotal support 21 to facilitate winding of the coil. The form 20 is provided with a raised upper portion 22 having a series of steps 23 on one of its sides. Each step 23 is of a height and width substantially the same as that of the conductor from which the coil is to be wound. A coil is illustrated in the drawing consisting of four turns, and a form is provided with four steps 23 for making this coil. The stepped face of this portion 22 of the form has a substantially straight central section 24 and end turn sections 25 and 26 extending at a substantial angle from the central section 24. As shown in Fig. 6, the height of the end section of each step 23 decreases gradually from the central section toward the base 20, so that the top surface of each step slopes downwardly from each end of the central straight section 24 to the level of the upper surface of the base 20 at each end thereof. Each end of the first step has an extension 27 extending from the straight central section 24 which increases gradually in width towards its outer end. The length of these extensions is determined by the desired length of the coil end turns 15 and 16 and the end thereof is curved to provide a gradual return bend in the end of the coil 10. The riser of the first step includes the front face of the extension 27, and the surface of the first step slopes downwardly from the straight central section to the level of the base to provide a groove of a width equal to the width of the conductor and is formed between the back of the extension 27 and the base 22. A groove 28 of a depth equal to the depth of a conductor is formed in the upper surface of the base 20 and extends from the edge of the form to the foot of the extension 27 of the lowest step. A retaining clip 29 is pivotally secured to each extension 27 near the end thereof for holding the coil conductor in position while the coil is being formed.

To wind the coil on the form, the end of a conductor 30 of rectangular section is fed from a reel 40 as diagrammatically shown in Fig. 7, and is placed in the groove 28 of the form 20 which is rotatably mounted on a pedestal 41. The end of the conductor then is anchored to the form 20 by any suitable clamping device. In order to draw the conductor 30 from the feeding reel 40, the form 20 is rotated on its support 21 in a clockwise direction, as viewed in Figs. 4 and 7, and the first half 31 of the first coil turn is wound on the surface of the base 20 against the riser of the first step. When the form 20 has been rotated such that the conductor has reached the opposite end of the form, the clip 29 is moved to a position over the conductor, and the conductor is kept under tension while it is passed around the end of the extension 27. The conductor then is arranged over the inclined top surface of the first step and the second half 32 of the first coil turn is formed on the tread of the first step of the form and lies against the riser of the second step. The conductor then is passed around the extension 27 at the starting end of the form and extends over the end of the conductor 30 which ais arranged in the groove 28, after which the clip 29 at this end of the form is adjusted to hold the complete first coil turn in position on the form. Thus, the first coil turn is formed with both coil sides 31 and 32 arranged on the form 20 on the same side of the center of rotation of the pivotal support 21. In a similar manner, the first coil side 33 of the second turn is wound on a surface of the base 20 against the coil side 31 and is passed around the extension 27 on the outside of the first turn. The conductor then is arranged on the inclined end portion of the second step and the second coil side 34 of the second turn is arranged on the tread of the second step against the riser of the third step. This operation is continued until the desired number of turns is obtained. The finished coil made by this process has substantially straight side sections 31, 33, 35, and 37 of the turns which lie parallel and close to each other on the substantially flat surface of the base 20, and other substantially straight coil sides 32, 34, 36, and 38 parallel to each other and to the other straight side sections arranged on the steps 23 of the form 20. The coil thus wound with the deep drop end turn sections is then removed from the form, and that side of the coil comprising the coil side conductor sections 32, 34, 36, and 38 arranged in stepped relationship is pressed until these coil side conductors lie side by side in substantially the same plane as the coil side conductors 31, 33, 35, and 37 of the other side of the coil. The conductors of each of the two coil sides respectively then are securely bonded together by applying a suitable insulating material, such as shellacked paper, and are then baked in any conventional manner in a hot press. The substantially straight side sections of the coil then are spread apart to a predetermined desired width and twisted or turned from the plane in which they are wound to the positions illustrated in Figs. 1, 2, and 3. Any further desired insulating material then is applied to the completed coil.

While I have illustrated and described a particular embodiment of my invention modifications thereof will occur to those skilled in the art. I desire it to be understood, therefore, that my invention is not to be limited to the particular arrangement and method disclosed, and I intend in the appended claims to cover all modifications which do not depart from the spirit and scope of my invention.

What I claim as new and desire to secure by Letters Patent of the United States is:

1. The method of making preformed coils with deep drop ends for dynamo-electric machines, comprising winding a conductor on a form to provide a coil with a plurality of turns lying in substantially the same plane with a pair of straight side sections lying parallel and close together and end sections extending at a substantial angle to the straight sections, arranging in stepped relationship to one another the conductor turns of the straight section lying on the side of the coil toward which the end sections extend, and removing the coil from the form and forming it so that the straight sections are spaced apart a predetermined width.

2. The method of making preformed coils with deep drop ends for dynamo-electric machines which comprises winding a conductor on a form into a coil to provide coil sides having straight sections lying parallel and close together and end turn sections extending at an angle to the straight sections, arranging in stepped relationship to one another the conductor turns of the straight section lying on the side of the coil toward which the end sections extend, and removing the coil from the form and then forming the coil so that the straight sections are spaced apart a predetermined width.

3. The method of making preformed coils for dynamo-electric machines comprising winding a conductor on a form to provide a coil with a plurality of turns lying in substantially the same plane with a pair of straight sections lying parallel and close together and end sections extending toward of the straight sections at a substantial angle to the straight sections, arranging in stepped relationship to one another the conductors of the straight section lying on the side of the coil toward which the end sections extend, removing the loop from the form, pressing the stepped conductor sections to lie in the same plane as the other sections of the coil, and forming the coil so that the straight sections are spaced apart a predetermined width.

4. The method of making preformed coils with deep drop ends for dynamo-electric machines which comprises winding a conductor into a coil on a form to provide a coil having a straight section with the coil turns lying substantially in the same plane and another straight section lying parallel to and close to the first mentioned straight section with its conductors in stepped relationship to one another and with the ends of the coil arranged substantially in the same plane as the straight section but extending at an angle to the straight section, removing the coil from the form, pressing the stepped portions of the turns of the second-mentioned straight section to lie in the same plane as the turns of the other straight section, and then forming the coil so that the two straight sections are spaced apart a predetermined width.

STANLEY O. SHIELDS.

CERTIFICATE OF CORRECTION.

Patent No. 2,275,871.　　　　　　　　　　　　　　　March 10, 1942.

STANLEY O. SHIELDS.

It is hereby certified that error appears in the printed specification of the above numbered patent requiring correction as follows: Page 2, second column, line 43, claim 3, after "toward" insert --one--; and that the said Letters Patent should be read with this correction therein that the same may conform to the record of the case in the Patent Office.

Signed and sealed this 28th day of April, A. D. 1942.

(Seal)　　　　　　　　　　　　　　　　　　　　Henry Van Arsdale,
　　　　　　　　　　　　　　　　　　　Acting Commissioner of Patents.